UNITED STATES PATENT OFFICE.

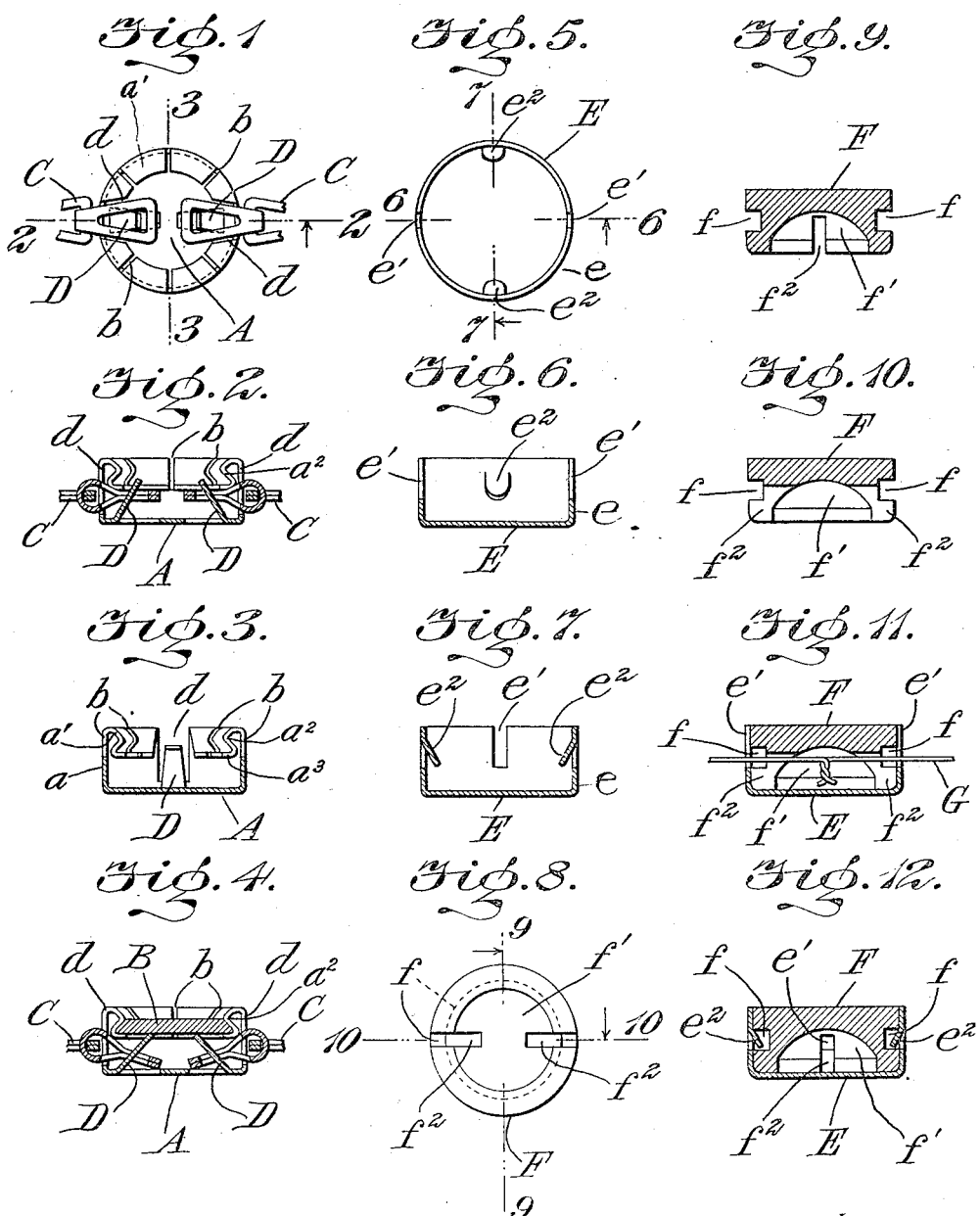

JOHN L. DINSMOOR, OF NEW YORK, N. Y.

SEAL.

1,122,872.  Specification of Letters Patent.  Patented Dec. 29, 1914.

Application filed June 21, 1911. Serial No. 634,434.

*To all whom it may concern:*

Be it known that I, JOHN L. DINSMOOR, a citizen of the United States, residing in the city of New York, borough of Brooklyn, county of Kings, and State of New York, have invented a certain new and useful Seal, of which the following is a specification.

This invention is a seal embodying various features of novelty, among which may be mentioned the following:—first, a seal comprising two members, one of which is reusable and the other composed of fictile material and locked within the reusable member; second, a seal comprising two members, one of which has a yieldable portion to permit the insertion therein of the other member, said latter member being composed, preferably, of fictile material, and being adapted to be renewed; and, third, a seal composed of two members one of which is a fictile member and adapted to be positioned within the other member and one of said members being provided with means for securing a shackle thereto.

Features of novelty, other than those specified, will be apparent from the hereinafter detailed description.

In the accompanying drawings, I have illustrated different practical embodiments of the invention, but the constructions shown therein are to be understood as illustrative, only, and not as defining the limits of the invention.

Figure 1 is a plan view of one form of a seal constructed in accordance with this invention, and illustrating means for the attachment of a shackle to one of the two members composing the seal. Fig. 2 is a vertical section on the line 2—2 of Fig. 1. Fig. 3 is a vertical section in a plane at right angles to Fig. 2 and on the line 3—3 of Fig. 1. Fig. 4 is a vertical cross section through the seal, with an insertible member positioned within the body member or casing of the seal in a manner to preclude access to the shackle attaching or anchoring means within the casing or body member of the seal. Fig. 5 is a plan view of a casing or body member of another embodiment of the invention. Figs. 6 and 7 are cross sections through the casing or body member on the lines 6—6 and 7—7, respectively, of Fig. 5. Fig. 8 is a plan view of an insertible member adapted to be positioned within the body or casing member. Figs. 9 and 10 are cross sections through the insertible member on the line 9—9 and 10—10, respectively, of Fig. 8. Figs. 11 and 12 are vertical cross sections through a complete seal formed by the assemblage of the casing or body member and the insertible member of Figs. 5 and 8, respectively.

The seal shown in Figs. 1 to 4, inclusive, comprises two members A, B which are separate from a shackle C.

Member A constitutes the body member or casing of the seal, and it is composed, preferably, of metal in one piece. Said body member is provided with an upstanding rim $a$, and with an inturned flange $a'$, said rim being folded or turned over upon itself so as to produce the inturned flange. The flange is inclined with respect to the upstanding rim, so as to produce a shoulder $a^2$, and the lower or inner extremity of the flange is turned inwardly to produce a ledge $a^3$. The inturned flange is rendered flexible or yieldable by providing slits $b$ therein, any desired number of slits $b$ being produced in the flange, preferably, equi-distant from each other. The slits extend through the shouldered part $a^2$, and into the top edge of rim $a$, and, preferably, these slits extend through the inwardly extending ledge $a^3$ at the lower edge of flange $a'$.

One of the members, A or B, of the new seal is provided with means for the attachment or anchorage of shackle C, but in the construction shown in Figs. 1 to 4, inclusive, it is preferred to provide the casing or body member A with the shackle anchoring means. To this end, body A is provided with prongs or spurs D, the same being, preferably, struck up from the metal composing the bottom of the body member, said prongs being bent upwardly into the chamber of the body member and positioned below the inturned flange $a'$. The body member or casing A is provided in the upstanding rim $a$ with slots or openings $d$, the latter being opposite to or in line with the upstanding prongs D. The respective end portions of the shackle C are adapted to be passed through slots $d$ and to engage with prongs D, as shown in Figs. 1, 2 and 4 of the drawings, whereby the shackle is adapted to be attached to the anchoring means provided within the casing or body member. As shown, shackle C is a chain, the links of which are adapted to be engaged with the anchoring prongs D, but it is evident that other forms of shackles may be used in connection with the seal.

Member B of the seal is, preferably, in the form of a disk, said member B being composed of frangible material, such as porcelain. The fictile material is, preferably, molded in a single solid piece to produce the frangible member of the required diameter and thickness. As shown, the insertible member is composed of fictile material in the form of a disk with beveled or inclined edges, said fictile material being rigid, for the purpose of compressing the inturned slitted flange during the operation of inserting the fictile member within the casing or body member of the seal. The insertible member is adapted to be pressed into position by forcing said member in a sidewise direction within flange $a'$ of the casing or body member, but the inward movement of the fictile member, during the operation of inserting it, is limited or arrested by ledge $a^3$ at the inner edge of the inturned flange $a'$, whereby the fictile member is retained by the slitted flange in a locked position within the casing and substantially parallel to the bottom of said casing.

The operation of the device will be evident from the foregoing description. The ends of shackle C are inserted through slots $d$ of member A, and said shackle is attached or connected to anchoring prongs D. The fictile member B is now placed in position on the open side of casing or body member A, and pressure is applied to said member B, for the purpose of snapping it into locking engagement with the casing or body member. Sufficient pressure is applied to member B to force it below shoulder $a^2$ of the inturned flange and into engagement with the ledge $a^3$ at the bottom of said flange, the slitted flange having a certain amount of elasticity, in order that it may yield or give to the movement of the rigid insertible member. The member B, when in position, is locked within the casing by shoulder $a^2$ and ledge $a^3$ of the inturned flange, and by frictional engagement with the metal composing the flange. Member B is retained within the casing or body member, and in a spaced or predetermined position relative to the bottom of the casing and to the shackle anchoring means. Said member B operates to preclude ready access to the shackle and the anchoring means therefor, so that the seal cannot be tampered with or the shackle detached without first breaking the fictile member. The fictile member is clamped peripherally within the casing, thus precluding access to the edges of said member by a tool or implement, so that the member cannot be pried or forced out of position when it is inserted and locked within the casing. The fictile member is substantially incased by the body member, but while the edges of the fictile member are frictionally locked to, and concealed by, the compressible or yieldable flange and within the casing, yet a part of the fictile member is exposed through the open side of the casing. This allows the fictile member to be broken by a blow of a suitable implement, whereupon the broken pieces of the fictile member may be removed from the metallic body member or casing. This permits an operator to obtain access to the shackle, for the purpose of disconnecting it from the seal, but such access is obtained only by breaking the fictile member, thus giving evidence of tampering with the seal. It is apparent that the metallic body or casing member may be used again by employing other fictile members B of the required size and form. My invention precludes access from being obtained to the part or structure to which the seal is applied, unless the fictile member is broken or destroyed, but one of the parts composing the seal can be used an indefinite number of times by employing different fictile members B in connection therewith.

Figs. 5 to 12, inclusive, illustrate another embodiment of the invention, wherein there is employed a casing or body member E, composed, preferably, of metal, and an insertible member F composed, preferably, of fictile material. Casing or body member E is provided with a rim $e$, said rim having notches $e'$ and locking lugs $e^2$. Member F is, preferably, molded in a single piece of porcelain or analogous frangible material, and it is provided with an annular groove $f$, a recess $f'$ and notches $f^2$. The notches intersect with the recesses and the annular groove. The insertible member F is of such form and size that said member can be easily inserted within the body or casing member. The tongues $e^2$ of the rim of member E are yieldable, more or less, to the pressure of member F when the latter is inserted within the casing or body member. The tongues $e^2$ of member E are positioned within the rim $e$, so as to enter the annular groove $f$ of member F, when said member is inserted into the casing, whereby member F is locked to the casing and within the rim $e$ thereof, thus precluding access to the edge portion of member F and preventing an unauthorized person from forcing member F out of the body member or casing E.

A salient feature of my invention is a snap seal composed of two parts, one part being a metal casing and the other part being composed of fictile material, the latter part being insertible into the casing and locked directly thereto. Two forms of the means for locking the insertible fictile part directly to the casing are shown in the drawings, but in each form the locking means consists of spring members extending inwardly of the casing. Thus the spring members in Figs. 1 to 4 are formed by the slitted inturned flange, the slitted metal being yieldable or of a springy nature, and said members extending inwardly of the rigid wall of the casing part, whereas in Figs. 5, 6, 7 and 12 the inwardly extending spring members are yieldable tongues struck up from the rigid wall of the casing part. It is thus apparent that the spring members afford means on the casing part for directly locking the insertible fictile part to said casing part.

The seal of Figs. 5 to 12, inclusive, is intended to be used, more particularly, in connection with shackle G, which may consist of cord, rope, wire or other strand material. The shackle, cord or wire is positioned within the seal body or casing by introducing the end portions through notches $e'$ of rim $e$, the end portions of the shackle, cord or wire being united and positioned within the body member or casing E. Member F is forced into the casing or body member by exerting pressure upon said member F sufficient to press back the tongues $e^2$ and to press member F into a position wherein the tongues $e^2$ of the casing will snap into the annular groove $f$ of member F. The recess $f'$ in the bottom of member F accommodates the knot of the shackle cord, or the united portions of the shackle wire, the strands of which pass through notches $f^2$ of member F and notches $e'$ in the rim of member E.

It is apparent that when the shackle is positioned within body member or casing E, and member F is locked to said body member, access cannot be obtained to the knot or united portions of the shackle, for the reason that member F and the casing operate to effectively conceal and house the knot or united portions of the shackle. To release the shackle from the seal, it is necessary to destroy member F, and for this purpose, the member is exposed through the open side of casing or body member E. By reference to Figs. 11 and 12, it will be seen that member F, when inserted, is substantially flush with the edge of rim $e$ on the body E, and except for the exposed face of member F, said member is substantially incased by and within said body member or casing E. Furthermore, the means for locking the insertible member to the casing are housed or contained within said casing, and it is practically impossible to separate member F from the casing, without disrupting and destroying said member.

The parts composing my seal are simple in construction and economical to manufacture, and furthermore, said parts may be assembled easily and expeditiously without the employment of any tools whatever.

Having thus fully described the invention, what I claim as new, and desire to secure by Letters Patent is:—

1. A snap seal comprising two members separate from a shackle, one of said members being provided with means for anchoring the shackle, and means operable upon the insertion of one member into the other for locking the two members against a relative separating movement.

2. A snap seal comprising two members separate from a shackle, one of said members being a metallic casing provided with means for anchoring a shackle, said casing member being provided, also, with means operable upon the insertion of the other member for locking the two members against a relative separating movement.

3. A snap seal comprising two members separate from a shackle, one of said members being composed of fictile material and the other member being a metallic casing, said casing member being provided with means for anchoring a shackle and provided, also, with locking means operable upon the insertion of the fictile member for retaining the two members in a non-separating relation except upon the fracture of the fictile member.

4. A snap seal comprising two members separate from a shackle, one of said members being a metallic casing and the other member being composed of fictile material, said fictile member being insertible into the casing member so as to be partially incased thereby and to be accessible from the exterior of the casing member, means for retaining the fictile member in a non-separating relation to the casing member, and means positioned within the casing member and concealed from access by the fictile member for retaining a shackle in a non-separating relation to the seal.

5. A snap seal comprising two members separate from a shackle, one of said members being a metallic casing and the other member being insertible into said casing member so as to be substantially incased thereby, said casing member being provided with shackle-anchoring means positioned internally thereof, and means operable upon the insertion of said insertible member for retaining the two named members in a non-separating relation.

6. A snap seal comprising two members separate from a shackle, one of said members being a metallic casing provided with shackle-anchoring means positioned internally thereof, the other member being composed of fictile material and means for locking said fictile member within the casing member for precluding access to the shackle-anchoring means except upon the fracture of said fictile member.

7. A snap seal embodying two members separate from a shackle, one of said members being a casing and the other member being insertible within said casing, coöperating means on the casing member and the insertible member for locking the two members in non-separating relation, and shackle-anchoring means positioned in a space intermediate the surfaces of the two members.

8. A snap seal embodying two members separate from a shackle, one of said members being provided with shackle-anchoring means positioned interiorly of the walls of said member and provided, also, with means for locking the other member in fixed relation to said first named member, said other member coöperating with said first named member in precluding access to the shackle-anchoring means.

9. A snap seal embodying a metal casing and a member insertible within said casing, said casing being provided with shackle-anchoring means positioned interiorly of the walls of said casing, and coöperating means on the casing and the insertible member for locking said insertible member in fixed relation to said casing.

10. A snap seal composed of two parts, one of said parts being a metal casing provided with means for receiving a shackle and the other part being composed of fictile material insertible into said metal casing part, said metal casing part being provided with spring members extending inwardly thereof for locking said insertible fictile part directly to the metal casing part and independently of the shackle.

In testimony whereof I have signed my name to this specification in the presence of two subscribing witnesses.

JOHN L. DINSMOOR.

Witnesses:
H. I. BERNHARD,
J. F. MOTHERSHEAD.

Copies of this patent may be obtained for five cents each, by addressing the "Commissioner of Patents, Washington, D. C."